United States Patent
Johnson et al.

(10) Patent No.: US 10,953,987 B2
(45) Date of Patent: Mar. 23, 2021

(54) AIRCRAFT INTERIOR CONFIGURATION WITH FLEXIBLE USE SPACE

(71) Applicant: B/E Aerospace, Inc., Winston-Salem, NC (US)

(72) Inventors: Glenn A. Johnson, Rural Hall, NC (US); Daniel Udriste, Winston-Salem, NC (US); Alexander N. Pozzi, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 295 days.

(21) Appl. No.: 16/049,972

(22) Filed: Jul. 31, 2018

(65) Prior Publication Data

US 2020/0039626 A1 Feb. 6, 2020

(51) Int. Cl.
*B64D 11/06* (2006.01)
*A61G 3/08* (2006.01)

(52) U.S. Cl.
CPC ........ *B64D 11/0639* (2014.12); *A61G 3/0808* (2013.01); *B64D 11/062* (2014.12); *B64D 11/0691* (2014.12); *B64D 11/0698* (2014.12); *A61G 2220/10* (2013.01)

(58) Field of Classification Search
CPC .............. A61G 3/0808; A61G 2220/10; B64D 11/0627; B64D 11/0639; B64D 11/0691; B64D 2011/0092; B64D 11/0698; B60N 2/245

See application file for complete search history.

(56) References Cited

U.S. PATENT DOCUMENTS

| | | | | |
|---|---|---|---|---|
| 2,556,076 A * | 6/1951 | Evans | ................ | B64D 11/0641 5/9.1 |
| 3,314,720 A * | 4/1967 | Millington | ............. | B64D 11/06 297/216.1 |
| 4,266,822 A * | 5/1981 | Barecki | ................... | A61G 3/06 105/345 |
| 5,026,225 A | 6/1991 | McIntyre | | |
| 5,259,575 A * | 11/1993 | Cabrera | ................... | B61D 1/02 105/316 |
| 5,383,629 A * | 1/1995 | Morgan | ................. | B64D 11/00 244/118.6 |
| 5,769,360 A * | 6/1998 | Kerbis | ................... | B64D 11/06 244/118.6 |

(Continued)

FOREIGN PATENT DOCUMENTS

| | | |
|---|---|---|
| EP | 3608227 A1 | 2/2020 |
| WO | 2016/157081 A1 | 10/2016 |

OTHER PUBLICATIONS

International Search Report for Application No. 19189311.4-1010 dated Jan. 10, 2020.

*Primary Examiner* — Joseph W Sanderson
(74) *Attorney, Agent, or Firm* — Suiter Swantz pc llo

(57) ABSTRACT

An interior configuration for an aircraft including a longitudinal aisle and rows of passenger seats, wherein a row of the passenger seats is disposed in a flexible use space adjacent the aisle and a bulkhead, and wherein the flexible use space includes a floor pallet and attendant seats equipped with flip-up seat bottoms such that the flexible use space can be configured for passenger seating or to provide securement space within the flexible use space for securing items such as a wheelchair, pet carrier, large items and items of value.

8 Claims, 9 Drawing Sheets

(56) References Cited

U.S. PATENT DOCUMENTS

| | | | |
|---|---|---|---|
| 6,113,325 A | 9/2000 | Craft | |
| 6,691,952 B2* | 2/2004 | Keogh | A61G 3/00 |
| | | | 244/118.5 |
| 6,923,606 B2* | 8/2005 | Fehrle | A61G 1/06 |
| | | | 211/173 |
| 7,455,490 B1* | 11/2008 | Goosen | A61G 3/0808 |
| | | | 410/7 |
| 8,152,101 B2* | 4/2012 | Law | A61G 5/125 |
| | | | 244/118.5 |
| 8,414,234 B2* | 4/2013 | Girardin | B60R 22/22 |
| | | | 410/7 |
| 8,911,188 B1* | 12/2014 | Mill | B60N 2/245 |
| | | | 410/23 |
| 9,180,969 B2* | 11/2015 | Kunze | A61G 5/00 |
| 9,504,617 B2* | 11/2016 | Hammarskjold | B60P 3/075 |
| 9,511,847 B2* | 12/2016 | Ehlers | B64C 1/20 |
| 9,585,800 B2* | 3/2017 | Hammarskjold | B60P 7/0807 |
| 9,616,843 B2* | 4/2017 | Girardin | B60N 2/304 |
| 9,688,165 B2* | 6/2017 | Mill | A61G 3/0808 |
| 9,738,385 B2* | 8/2017 | Mayer | B64D 11/0023 |
| 9,783,280 B2* | 10/2017 | Llamas Sandin | B64C 1/00 |
| 9,833,367 B2* | 12/2017 | Mill | A61G 3/0808 |
| 10,494,103 B2* | 12/2019 | Roth | B64D 11/0627 |
| 10,611,484 B2* | 4/2020 | Demary | B64D 11/0696 |
| 2003/0057323 A1* | 3/2003 | Keogh | B64D 11/0604 |
| | | | 244/118.5 |
| 2003/0143052 A1* | 7/2003 | Fehrle | B64C 1/20 |
| | | | 410/46 |
| 2009/0087278 A1* | 4/2009 | Girardin | B60N 2/242 |
| | | | 410/3 |
| 2012/0219395 A1* | 8/2012 | Inaguma | A61G 3/08 |
| | | | 414/556 |
| 2012/0292953 A1* | 11/2012 | Kunze | A61G 3/06 |
| | | | 297/130 |
| 2013/0280002 A1* | 10/2013 | Girardin | B60P 3/079 |
| | | | 410/7 |
| 2014/0346825 A1* | 11/2014 | Mill | B60N 2/242 |
| | | | 297/232 |
| 2015/0166166 A1* | 6/2015 | Llamas Sandin | B64D 11/0639 |
| | | | 244/13 |
| 2015/0284082 A1* | 10/2015 | Mayer | B64D 11/0023 |
| | | | 244/118.5 |
| 2015/0284097 A1* | 10/2015 | Schliwa | B64D 11/02 |
| | | | 244/118.6 |
| 2015/0307179 A1* | 10/2015 | Ehlers | B64C 1/20 |
| | | | 244/118.1 |
| 2015/0328067 A1* | 11/2015 | Girardin | B60P 3/079 |
| | | | 410/7 |
| 2016/0016498 A1* | 1/2016 | Hammarskjold | B60P 3/079 |
| | | | 410/7 |
| 2016/0016499 A1* | 1/2016 | Hammarskjold | A61G 3/0808 |
| | | | 410/7 |
| 2017/0008428 A1* | 1/2017 | Mill | A61G 3/0808 |
| 2017/0231844 A1* | 8/2017 | Gale | A61G 3/0808 |
| | | | 410/7 |
| 2017/0320580 A1 | 11/2017 | Roth et al. | |
| 2019/0071181 A1 | 3/2019 | Demary et al. | |
| 2019/0133852 A1* | 5/2019 | Ghannam | A61G 3/0808 |

* cited by examiner

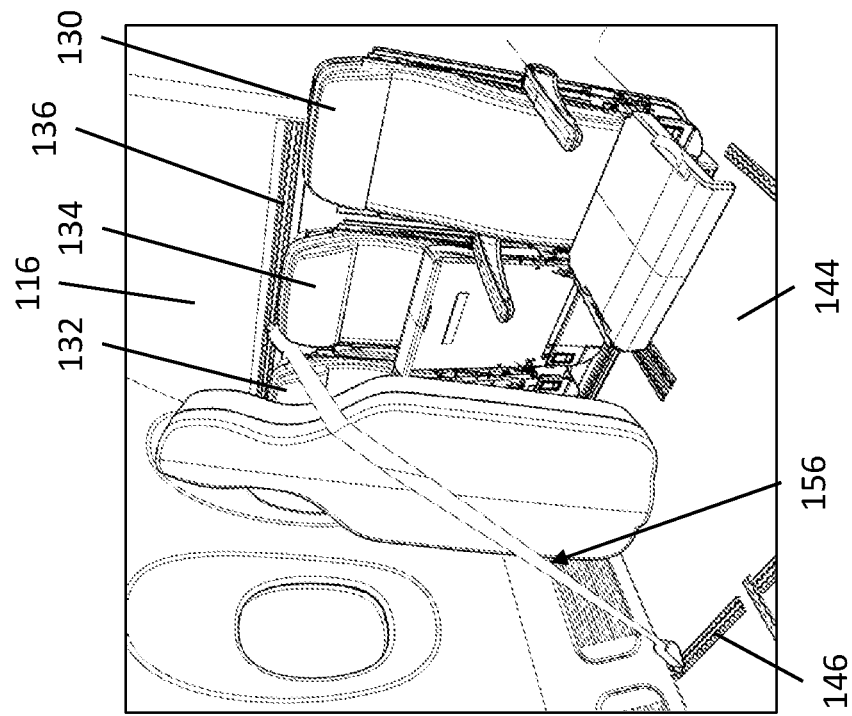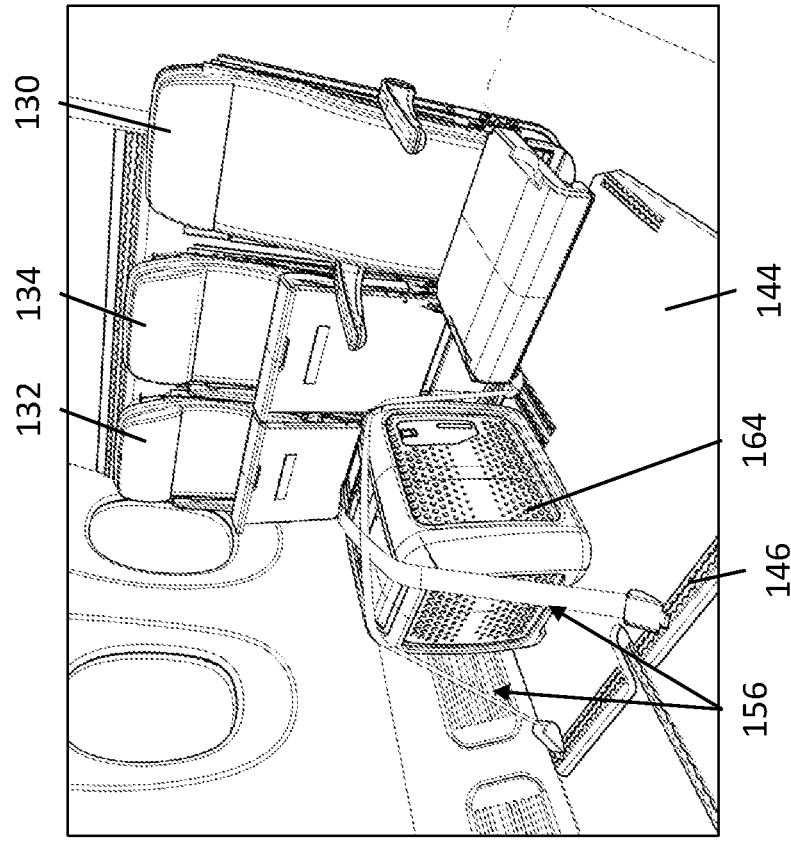

AIRCRAFT INTERIOR CONFIGURATION WITH FLEXIBLE USE SPACE

TECHNICAL FIELD AND BACKGROUND

The present disclosure is generally directed to an aircraft interior configuration including flexible use space, and more particularly, flexible use space in the main cabin reconfigurable to accommodate conventional traveling passengers or those requiring securement space for a wheelchair or other items.

Conventional traveling passengers are typically able to board a plane on their own and make use of standard aircraft passenger seats. Passengers confined to a wheelchair cannot, and thus require special boarding procedures and accommodations. Part of the special boarding procedures involves transferring a passenger from their own personal wheelchair to a transfer wheelchair able to traverse a narrow aircraft aisle. Such transfer is not only disruptive to the passenger, but transfer wheelchairs are not catered to specific passenger needs and cannot be used for seating during flight. Thus, the passenger must be transferred a second time from the transfer wheelchair to a standard passenger seat, further disrupting the passenger.

To minimize disruption and better cater to passenger needs, it would be desirable to allow a wheelchair user to remain in their own personal wheelchair during boarding and flight. One obstacle is that aircraft aisles are typically too narrow to accommodate a standard width wheelchair. Another obstacle involves creating space in the main cabin to accommodate and secure a wheelchair. While the first obstacle can potentially be overcome by creating a certified wheelchair having a narrow width, the second obstacle requires an interior cabin configuration able to accommodate and secure in place a wheelchair without abandoning a traditional passenger seating arrangement, and without sacrificing seating density.

Accordingly, what is needed is an aircraft interior configuration having a flexible use space that can easily be reconfigured to accommodate conventional traveling passengers or wheelchair users, as well as other provide other uses such as care giver seating, storing pet crates, and storing large objects or objects of value.

SUMMARY OF THE INVENTIVE ASPECTS

In one aspect, embodiments of the inventive concepts disclosed herein are directed to an interior configuration for an aircraft including an aisle extending along a longitudinal axis of the aircraft, a flexible use space disposed laterally adjacent the aisle, a bulkhead disposed at one end of the flexible use space, attendant seats disposed in the flexible use space affixed to the bulkhead, with each attendant seat comprising a flip-up seat bottom, and a floor pallet disposed in the flexible use space and including at least one seat track. The flexible use space is reconfigurable between a first configuration in which the attendant seats are used as passenger seats and a second configuration in which at least one seat bottom is flipped up to provide space to receive and secure an item in place on the floor pallet.

In another aspect, the attendant seats may include an inboard attendant seat disposed adjacent the aisle, an outboard attendant seat disposed adjacent a fuselage of the aircraft, and a middle attendant seat disposed between the inboard and outboard attendant seats, wherein in the second configuration the seat bottom of the outboard attendant seat is flipped down for use as a seat and the seat bottom of each of the middle and inboard attendant seats is flipped up to provide securement space in the flexible use space to receive and secure in place a wheelchair on the floor pallet.

In a further aspect, the bulkhead may be a rear bulkhead disposed perpendicular to the longitudinal axis of the aircraft, and the attendant seats may be disposed laterally adjacent and forward facing.

In a further aspect, the bulkhead may include at least one seat track for affixing the attendant seats to the bulkhead, and the attendant seats may be free of attachment to the floor pallet.

In a further aspect, the floor pallet may include at least one seat track disposed perpendicular to the longitudinal axis of the aircraft and at least one seat track disposed parallel to the longitudinal axis of the aircraft.

In a further aspect, the floor pallet may be affixed to the floor of the aircraft and may include at least one recess disposed along an edge thereof positioned in surrounding relation to a leg of a seat disposed adjacent the flexible use space.

In a further aspect, the at least one restraint assembly may include an adjustable length strap having a fastener at each end adapted to engage in the at least one seat track of the floor pallet.

In a further aspect, the interior configuration may include passenger seats disposed adjacent the flexible use space, wherein the passenger seats and the attendant seats are disposed in the same facing orientation and are visually similar in appearance.

In a further aspect, each of the attendant seats may include a frame affixed to the bulkhead and a backrest supported by the frame, and the seat bottom may be pivotably attached to the frame.

In another aspect, the inventive concepts disclosed herein are directed to an interior configuration for an aircraft including an aisle extending along a longitudinal axis of the aircraft, a plurality of rows of passenger seats disposed adjacent the aisle, and a rear bulkhead disposed aft of the plurality of rows of passenger seats, wherein a last row of the plurality of rows of passenger seats is disposed in a flexible use space, and each seat in the last row is an attendant seat affixed to the rear bulkhead and includes a flip-up seat bottom, and wherein the flexible use space is reconfigurable between a first configuration in which the attendant seats are used as passenger seats and a second configuration in which at least one seat bottom is flipped up to provide securement space to receive and secure an item in place within the flexible use space.

In another aspect, the flexible use space may include a floor pallet with seat track and at least one restraint assembly adapted to secure to the seat tracks.

In a further aspect, the last row of the plurality of rows of passenger seats may include an inboard attendant seat disposed adjacent the aisle, an outboard attendant seat disposed adjacent a fuselage of the aircraft, and a middle attendant seat disposed between the inboard and outboard attendant seats, and wherein in the second configuration the seat bottom of the outboard attendant seat is flipped down for use as a seat and the seat bottom of each of the middle and inboard attendant seats is flipped up to provide securement space in the flexible use space to receive and secure in place a wheelchair on the floor pallet.

In a further aspect, the rear bulkhead may include at least one seat track for affixing the attendant seats to the rear bulkhead, and the attendant seats may be free of attachment to the floor pallet.

In a further aspect, the floor pallet may include at least one seat track disposed perpendicular to the longitudinal axis of the aircraft and at least one seat track disposed parallel to the longitudinal axis of the aircraft.

In a further aspect, the floor pallet may be affixed to the floor of the aircraft and may include at least one recess disposed along an edge thereof positioned in surrounding relation to a leg of a passenger seat disposed forward of and adjacent the flexible use space.

In a further aspect, the at least one restraint assembly may include an adjustable length strap having a fastener at each end adapted to engage in the at least one seat track of the floor pallet.

In a further aspect, the rear bulkhead may be disposed perpendicular to the longitudinal axis of the aircraft and the plurality of rows of seats may be forward facing.

In a further aspect, each of the attendant seats may include a frame affixed to the rear bulkhead and a backrest supported by the frame, and the seat bottom may be pivotably attached to the frame.

In another aspect, the inventive concepts disclosed herein are directed to an interior configuration for an aircraft including a passenger cabin, an aisle disposed within the passenger cabin, a conventional passenger seating area disposed within the passenger cabin, a flexible use space disposed within the passenger cabin adjacent the aisle and the conventional passenger seating area, and a bulkhead disposed adjacent the flexible use space, wherein the flexible use space is reconfigurable between a first configuration for passenger seating and a second configuration providing securement space for an item.

In another aspect, the interior configuration may include a row of attendant seats disposed in the flexible use space and affixed to the bulkhead, each attendant seat including a flip-up seat bottom movable between a first position for use as a passenger seat and a second position providing securement space forward of the respective attendant seat, a floor pallet disposed in the flexible use space including at least one seat track, and at least one restraint assembly configured to secure to the at least one seat track of the floor pallet to secure an item in place on the floor pallet.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings:

FIG. 10 is a perspective view of flexible use space shown configured for passenger seating and pet carrier securement;

FIG. 11 is a perspective view of flexible use space shown configured for passenger seating and large object securement.

DESCRIPTION OF ILLUSTRATIVE EMBODIMENTS

Figure 1:
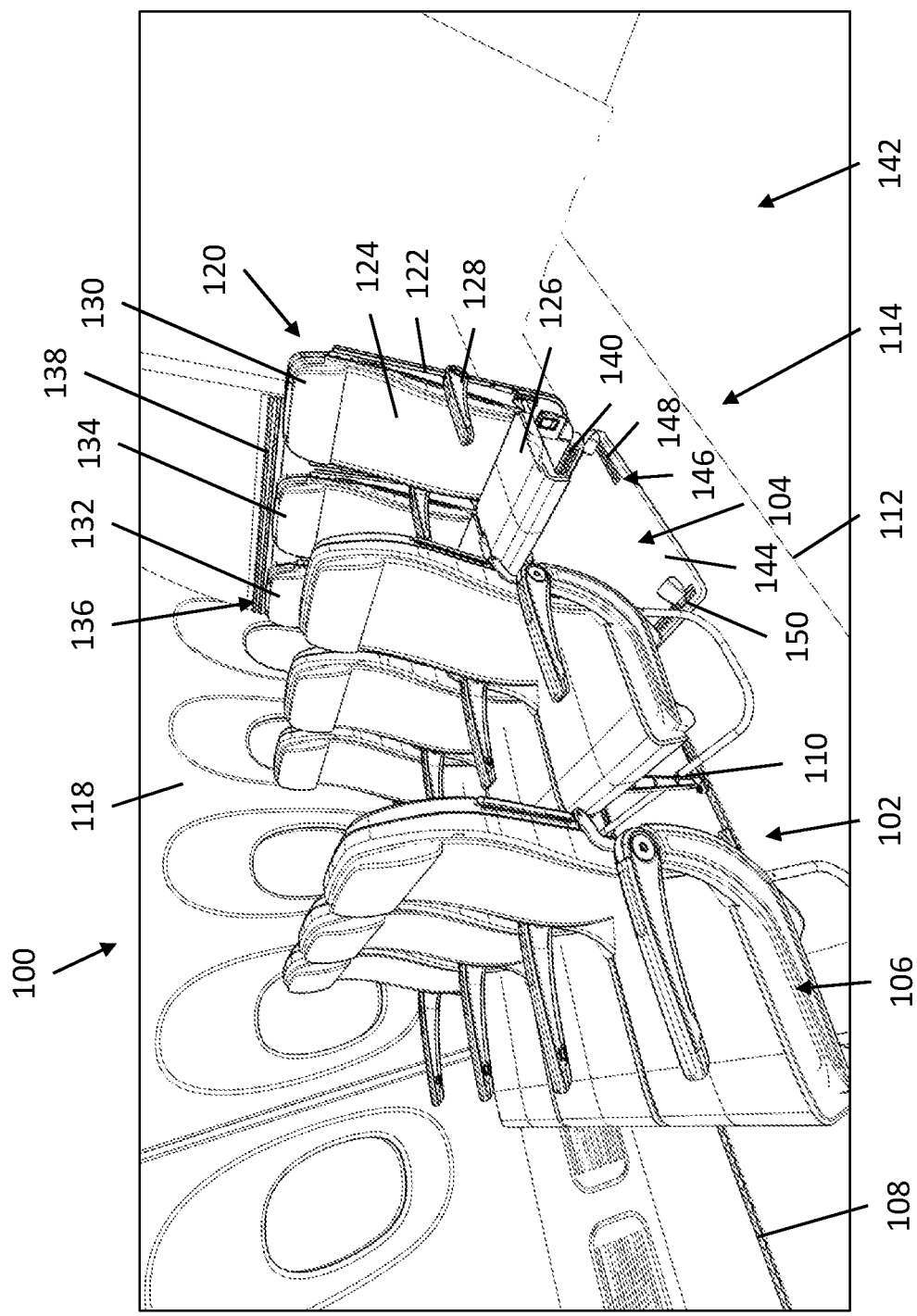
FIG. 1 is a perspective view of a portion of an aircraft interior configuration including flexible use space.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

The aspects, features and functions described below in connection with one embodiment are intended to be applicable to the other embodiments described below except where expressly stated or where an aspect, feature or function is incompatible with an embodiment. Further, the terms "about" and "substantially" with reference to any recited numerical value includes the recited value within a margin of 20%, more preferably 10%, and even more preferably 5%, and any values therebetween.

Referring to the drawings, disclosed are aspects of aircraft interior configurations, and particularly, main passenger cabin configurations having a zone or zones dedicated for conventional passenger seating and a zone or zones providing flexible use space. As used herein, the term "flexible use space" generally refers to space within a passenger seating area readily reconfigurable to provide conventional passenger seating, securement space for a wheelchair, securement space for pet storage, securement space for other items, and combinations thereof. Flexible use space may occupy a portion of a conventional passenger seating zone or may be separate therefrom. In one embodiment, flexible use space may occupy a portion of a conventional passenger seating zone such that the flexible use space is visually indistinguishable from an adjacent conventional passenger seating zone when the flexible use space is used for conventional passenger seating. Certain seat components such as backrests, armrests and headrests may be the same or similar in both the conventional passenger seating zone and the flexible use space for visually consistency throughout the passenger cabin. Flexible use space may be disposed in any location within the aircraft benefitting from the ability to reconfigure between passenger seating and another purpose, including but not limited to, at the rear of the passenger cabin adjacent the lavatory, at the front of the main cabin adjacent a forward bulkhead, in premium class seating areas, in galley areas, etc.

In one aspect, the flexible use space can be configured to provide conventional passenger seating. In another aspect, the flexible use space can be configured to provide securement space for items. In a further aspect, the flexible use space can be configured to provide both conventional passenger seating and securement space at the same time.

FIG. 1 depicts an exemplary aircraft interior configuration 100 generally including conventional passenger seating 102 adjacent flexible use space 104. The conventional passenger seating space 102 shown includes rows of economy class seats disposed forward facing. Each row of seats 106 includes three laterally adjacent seats including an inboard seat, an outboard seat, and a middle seat disposed between the inboard and outboard seats. The seat backrests may be recline-capable. Each row of seats 106 is supported on a frame that secures to the aircraft floor using conventional seat tracks 108 and track fasteners 110. As shown, the seat tracks 108 are disposed parallel to the longitudinal aircraft axis 112 and run substantially the length of the passenger cabin. The aircraft interior configuration 100 further includes an aircraft aisle 114 disposed parallel to the longitudinal aircraft axis 112. In an exemplary embodiment, the aircraft aisle 114 is a center aisle that runs the length of the passenger cabin.

The flexible use space 104 is a dedicated portion of the seating arrangement that can be configured for conventional passenger seating and/or securement space for items. As shown, the flexible use space 104 is disposed aft of the last row of conventional passenger seats and forward of a rear bulkhead 116. The rear bulkhead 116 can be disposed adjacent a lavatory, can be a lavatory wall, can divide seating spaces, can be a monument, etc. The flexible use space 104 is disposed laterally adjacent the aircraft aisle 114 such that the flexible use space 104 is accessible from the aisle 114. The flexible use space 104 as shown extends between the last row of conventional seats and the bulkhead 116, and from the aisle 114 to the fuselage 118. Other dispositions and configurations are envisioned such as adjacent a forward bulkhead, adjacent a lavatory, adjacent a galley, etc. An aircraft passenger seating arrangement may include one or any number of flexible use spaces in any disposition and within any seating class or classes.

Disposed within the flexible use space 104 is at least one attendant seat 120. As used herein, the term "attendant seat" generally refers to a low-profile passenger seat of the type configured to mount in an alternative location as compared to a conventional passenger seat that secures to the floor. Each attendant seat 120 generally includes a frame 122 configured for wall mounting, a backrest 124 supported by the frame 122, and a seat bottom 126 supported by the frame 122 and/or the backrest 124. The seat bottom 126 is a flip-up seat bottom, meaning that the seat bottom is movable or reconfigurable between a use position disposed substantially horizontal and a stowed position disposed generally vertical. In the stowed position, the seat bottom 126 may reside against the front of the backrest 124 and may lock in place. The seat bottom 126 may be pivotably attached to the frame 122 or the backrest 124 to facilitate movement between the use and stowed positions of the seat bottom 126. Each attendant seat 120 may further include at least one pivoting armrest 128. Each attendant seat 120 is preferably devoid of legs and/or frame members disposed under the seat bottom that extend into the securement space when the seat bottom is raised. In one embodiment, the attendant seats are free of any direct attachment to the aircraft floor.

The attendant seats 120 shown in FIG. 1 are arranged as a row of laterally adjacent attendant seats 120 including an inboard attendant seat 130, an outboard attendant seat 132, and a middle attendant seat 134 disposed between the inboard and outboard attendant seats. Other attendant seat configurations are envisioned including 1, 2, 3 . . . n number of attendant seats in various configurations and facing directions. The attendant seats shown are forward facing like the conventional seats for visually consistency throughout the seating class. As such, the flexible use space 104 is visually indistinguishable from the adjacent conventional seating area. The seat pitch between the last row of conventional seats and the row of attendant seats may be consistent with the seat pitch between rows of conventional seats. In an alternative embodiment, the seat pitch between the last row of conventional seats and the row of attendant seats may be greater to better accommodate a wheelchair and/or the storage of large objects. The same or similar backrests, headrests and pivoting armrests may be used in both the conventional passenger seats and the attendant seats for visual consistency.

Seat tracks 136 embedded within or affixed to the forward face of the rear bulkhead 116 serve to wall mount the attendant seats 120. As shown, the seat tracks 136 include an upper seat track 138 disposed near a top of the backrests 124, and a lower seat track 140 disposed just above the floor 142. The seat tracks 136 may additionally include a middle seat track disposed between the lower and upper seat tracks. The seat tracks 136 are provided in number and disposition based on one or more of the location and type of attendant seats used, items envisioned to be stowed, wheelchair configurations, etc. The seat tracks 136 allow the attendant seats to mount to a wall, at a height consistent with the adjacent conventional passenger seats, and free of attachment to the floor 142. Thus, when the seat bottoms 126 are stowed, securement space is provided between the backside of the last row of conventional seats and the stowed attendant seats for receiving and securing items such as a wheelchair, pet carrier, large objects, etc.

Also disposed within the flexible use space 104 is a structural floor pallet 144. The floor pallet 144 mounts directly to the aircraft floor 142, for example, using the seat tracks 108 in the floor 142. The floor pallet 144 includes at least one seat track 146 embedded within or affixed thereto. As shown, the floor pallet 144 includes first seat tracks 148 disposed proximate the rear end of the floor pallet and parallel to the longitudinal aircraft axis, and second seat tracks 150 disposed proximate the forward end of the floor pallet 144 and perpendicular to the longitudinal aircraft axis. As such, the interior configuration includes three separate sets of seat tracks including floor tracks 108 disposed in the floor 142 for securing the conventional passenger seats and the floor pallet 144, seat tracks 146 disposed in the floor pallet 144 for securing restraint assemblies as discussed in detail below, and seat tracks 136 disposed in the bulkhead 116 for securing the attendant seats 120.

The floor pallet 144 installs within the flexible use space 104 and may be sized to substantially correspond to the square footage of the flexible use space 104. The floor pallet 144 may be unitary or multi-piece to facilitate installation and depending on the square footage of the flexible use space. The floor pallet 144 preferably has a lightweight construction, is resistant to deformation, transfer loads on the restraint assemblies to the floor 142 and has a thin vertical profile to avoid a tripping hazard.

Figure 2:
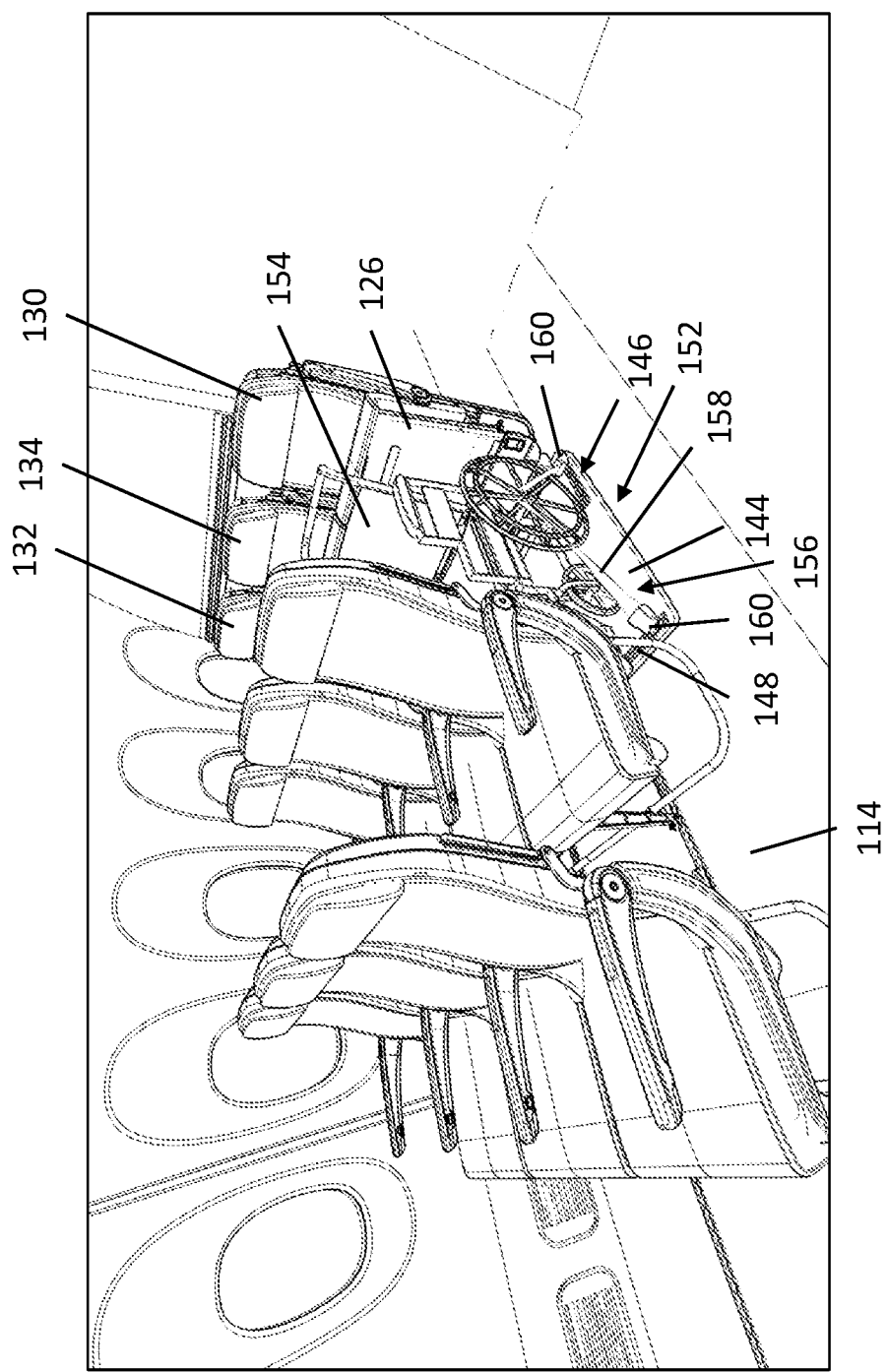
FIG. 2 is a perspective view of an aircraft interior showing flexible use space configured for securement space for a wheelchair.

Whereas FIG. 1 depicts the flexible use space 104 in a configuration for passenger seating, FIG. 2 depicts the flexible use space 104 in a configuration providing securement space for an item, for example, a wheelchair. Securement space is shown generally at reference numeral 152 laterally adjacent the aisle 114 and directly forward of the inboard and middle attendant seats 130 and 134 with their respective seat bottoms 126 in the stowed position. Thus, the securement space 152 in this configuration is accessible directly from the aisle 114. Once situated, a wheelchair 154 can be secured in place on the floor pallet 144 using one or more restraint assemblies 156 each generally including an adjustable length strap 158 and fasteners 160 disposed at opposing ends of the strap 158 configured to engage within the seat tracks 146 of the floor pallet 144. As shown, the wheelchair 154 may be secured in place using one or more restraint assemblies 156, wherein each restraint assembly 156 secures to one of the first and second seat tracks 148 and 150 and around part of the wheelchair. Restraint assemblies 156 may be used on both sides of the wheelchair, for example, securing both wheels. Restraint assemblies 156 may be secured to one or more of the seat tracks in any of the floor, floor pallet, and bulkhead.

Figure 4:
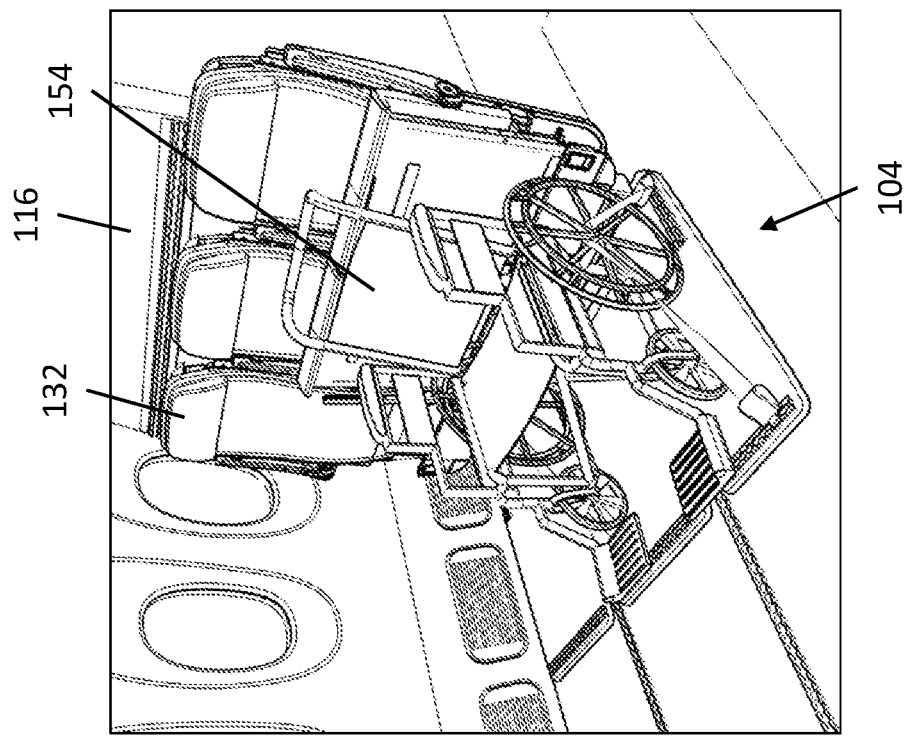
FIG. 4 is a perspective view of flexible use space shown configured for securement space for a wheelchair secured to the floor pallet.
Figure 3:
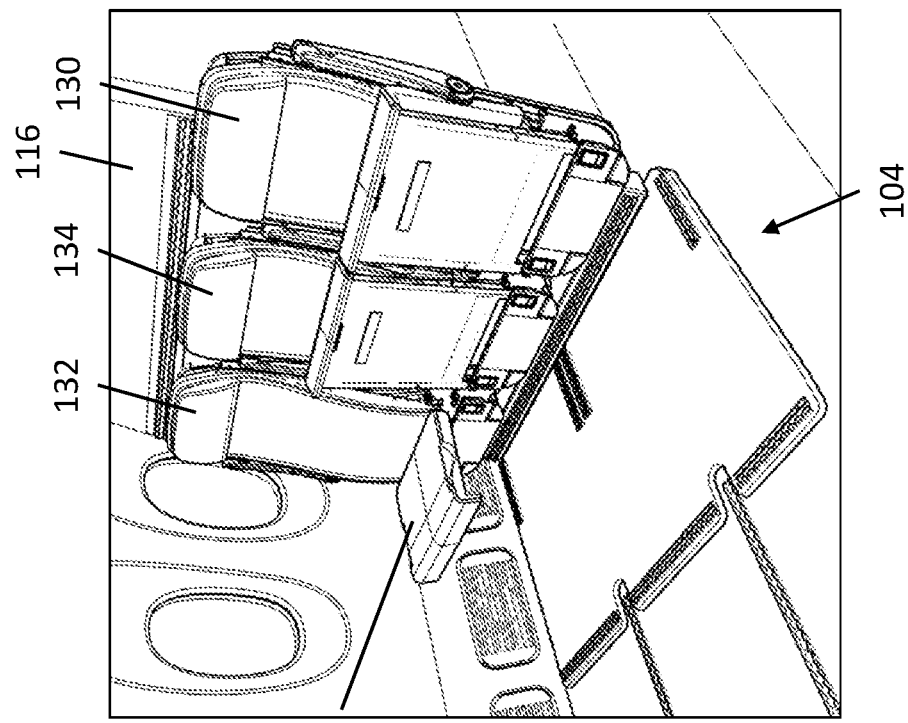
FIG. 3 is a perspective view of flexible use space shown configured to provide securement space.

FIG. 3 depicts an aircraft interior configuration in which the flexible use space 104 is disposed in a last row of passenger seats immediately forward of the rear bulkhead 116. As shown, the seat bottom 126 of the middle attendant seat 134 is in the stowed position, the seat bottom 126 of the inboard attendant seat 130 is in the stowed position, and the seat bottom 126 of the outboard attendant seat 132 is in the use position. Such flexible use space configuration provides securement space forward of the middle and inboard attendant seats 134, 130 for securing in place, for example, a wheelchair as shown in FIG. 4, and a passenger seat at the outboard attendant seat 132 position for a passenger able to use a conventional passenger seat, for example, a caregiver accompanying the wheelchair user. FIG. 4 depicts the seat bottom of the outboard attendant seat 132 removed to provide additional storage space to one side of the secured wheelchair 154.

Figure 5:
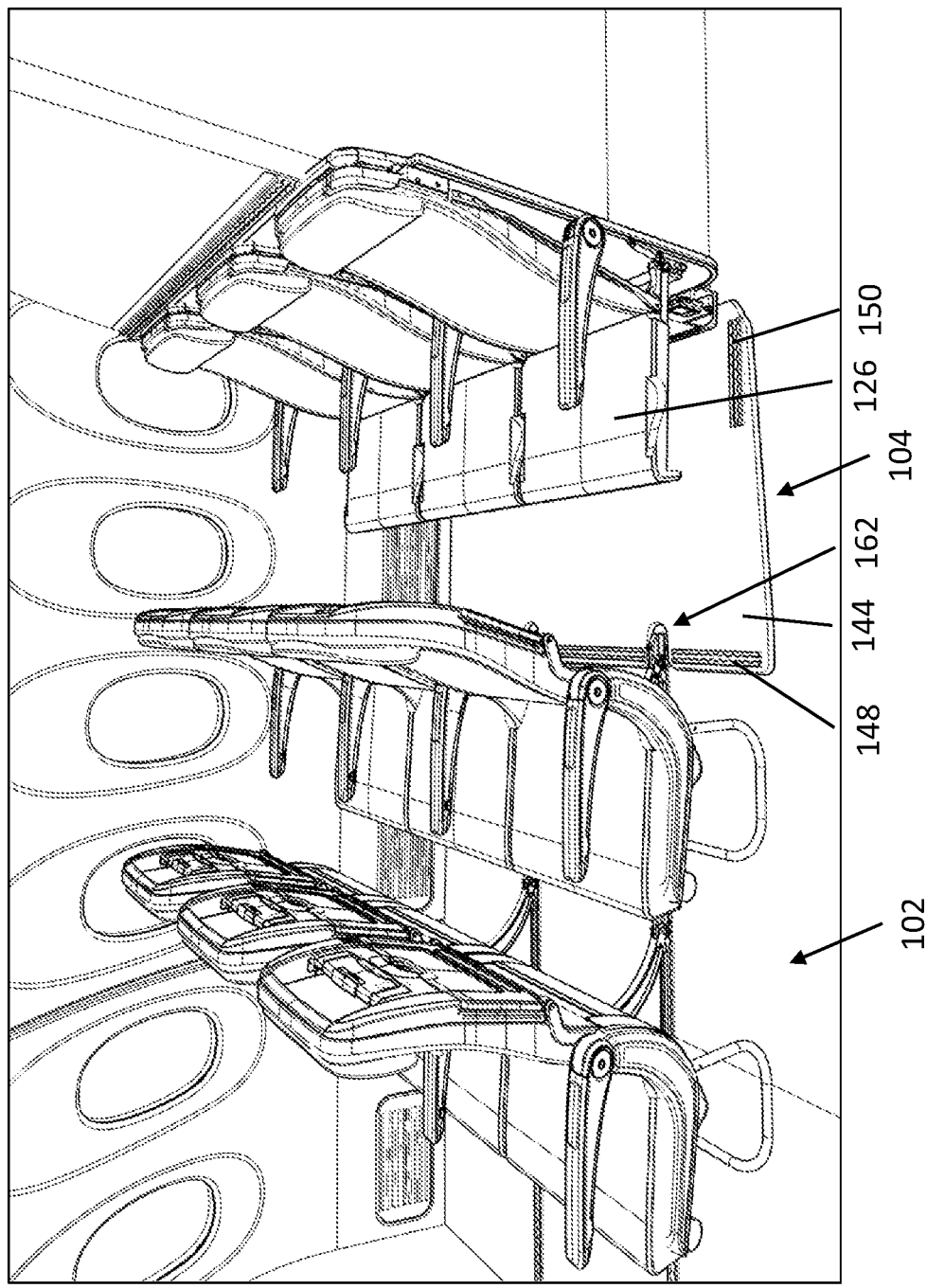
FIG. 5 is a side view of flexible use space shown configured for conventional passenger seating.

FIG. 5 depicts the flexible use space 104 in a passenger seating configuration in which all attendant seat bottoms 126 are in the use position. FIG. 5 further depicts the shape of the floor pallet 144 to include along the forward edge thereof at least one recess 162 positioned in surrounding relation to a leg and track fastener of a passenger seat adjacent the flexible use space. The recesses 162 allow portions of the floor pallet 144 to extend forward of the rear legs of the adjacent row of passenger seats, thereby expanding the flexible use space and locating the first seat tracks 148 farther from the second seat tracks 150 for leverage, to accommodate larger items, etc.

Figure 6:
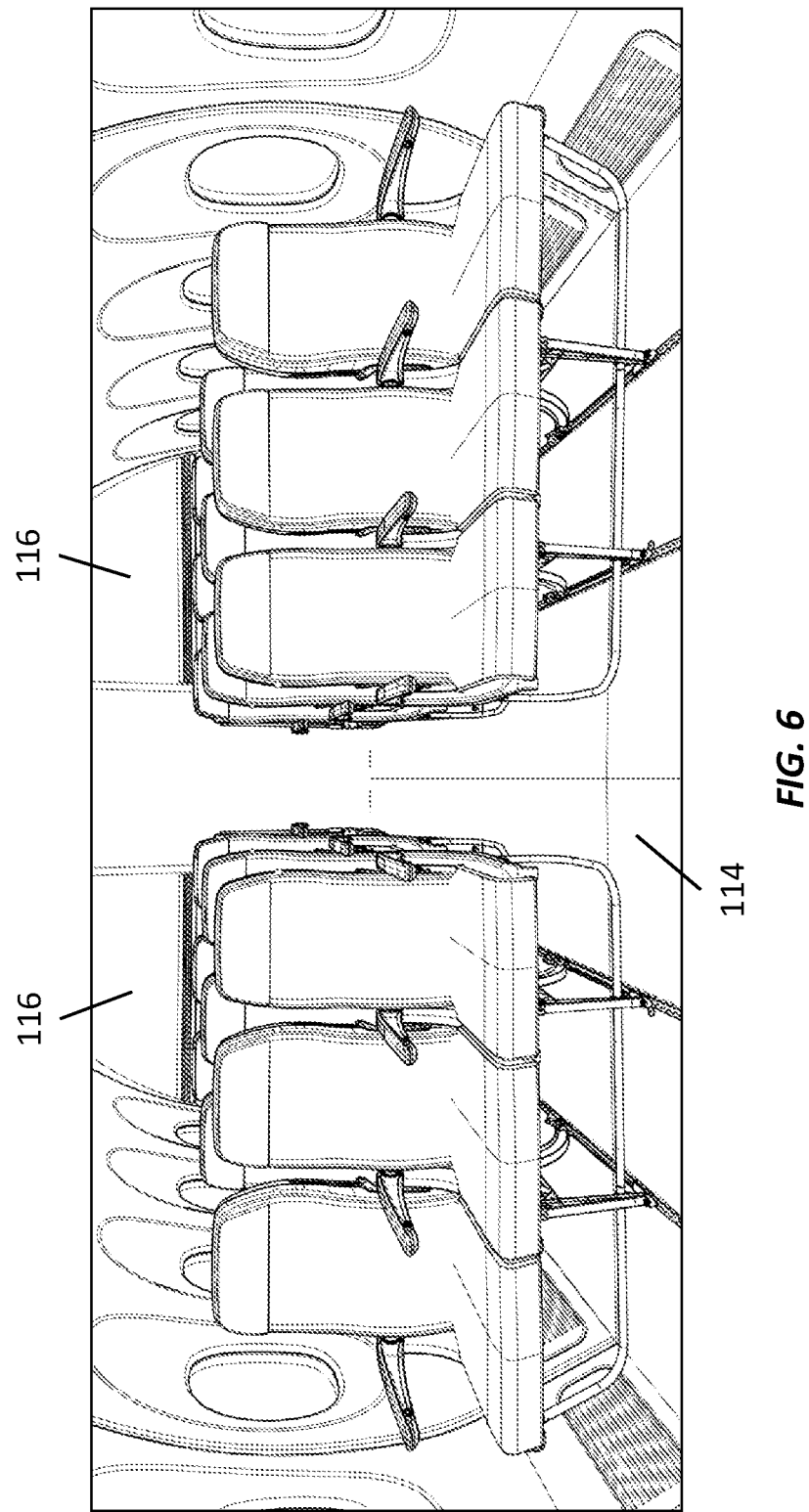
FIG. 6 is a front view of an aircraft interior configuration showing consistency among the visual appearance of passenger seats within and outside of a flexible use space.

FIG. 6 depicts an exemplary seating arrangement generally including rows of economy class passenger seats, a center aisle 114, and a rear bulkhead 116 disposed behind the last row of seats. Flexible use space is provided in the last row of seats on one or both sides of the aisle 114. As discussed above, the conventional passenger seats and the attendant seats within the flexible use space may share components to provide visual consistency throughout the cabin, such that to passengers boarding the aircraft it appears as a standard non-accessible interior.

Figure 7:
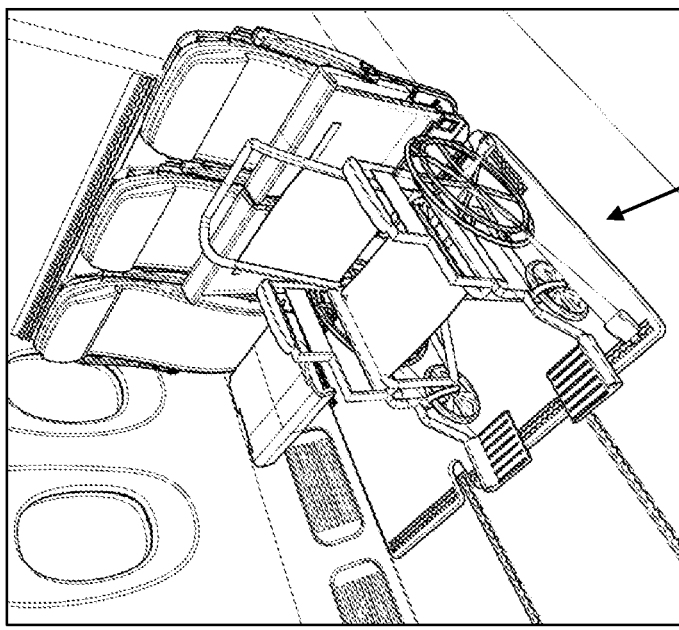
FIG. 7 is a perspective view of flexible use space showing a caregiver seat positioned alongside securement space for a wheelchair.

FIG. 7 depicts an aircraft interior configuration wherein the flexible use space 104 is configured to accommodate a wheelchair user and a caregiver or accompanying passenger seated alongside the secured wheelchair user.

Figure 8:
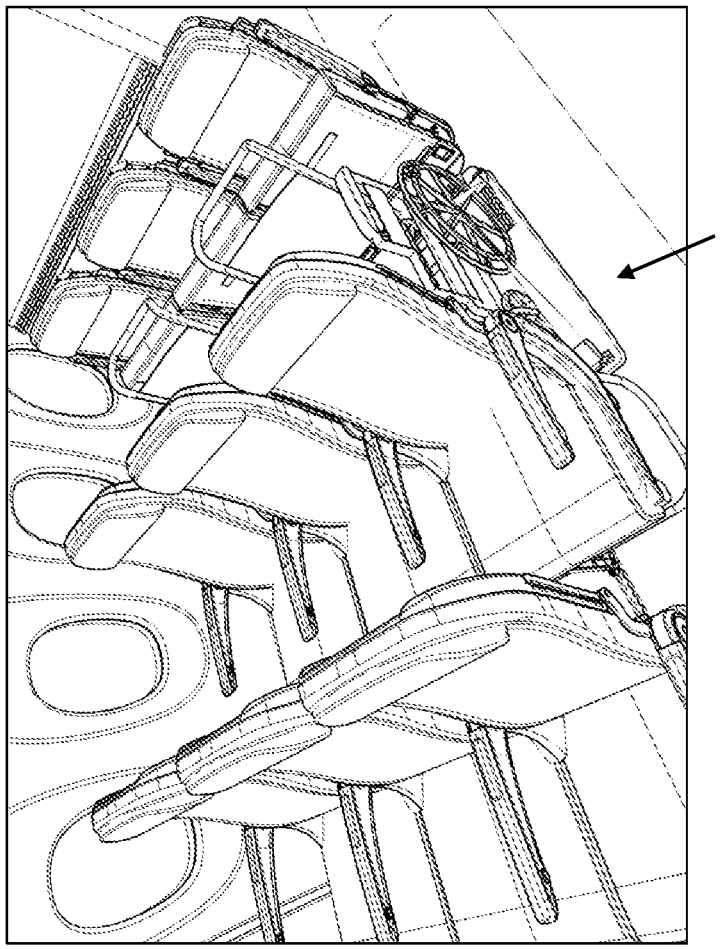
FIG. 8 is a perspective view of flexible use space configured to provide securement space for two wheelchairs side-by-side.

FIG. 8 depicts an aircraft interior configuration wherein the flexible use space 104 is configured to accommodate two wheelchair users in a side-by-side arrangement, airframe interior space permitting.

Figure 9:
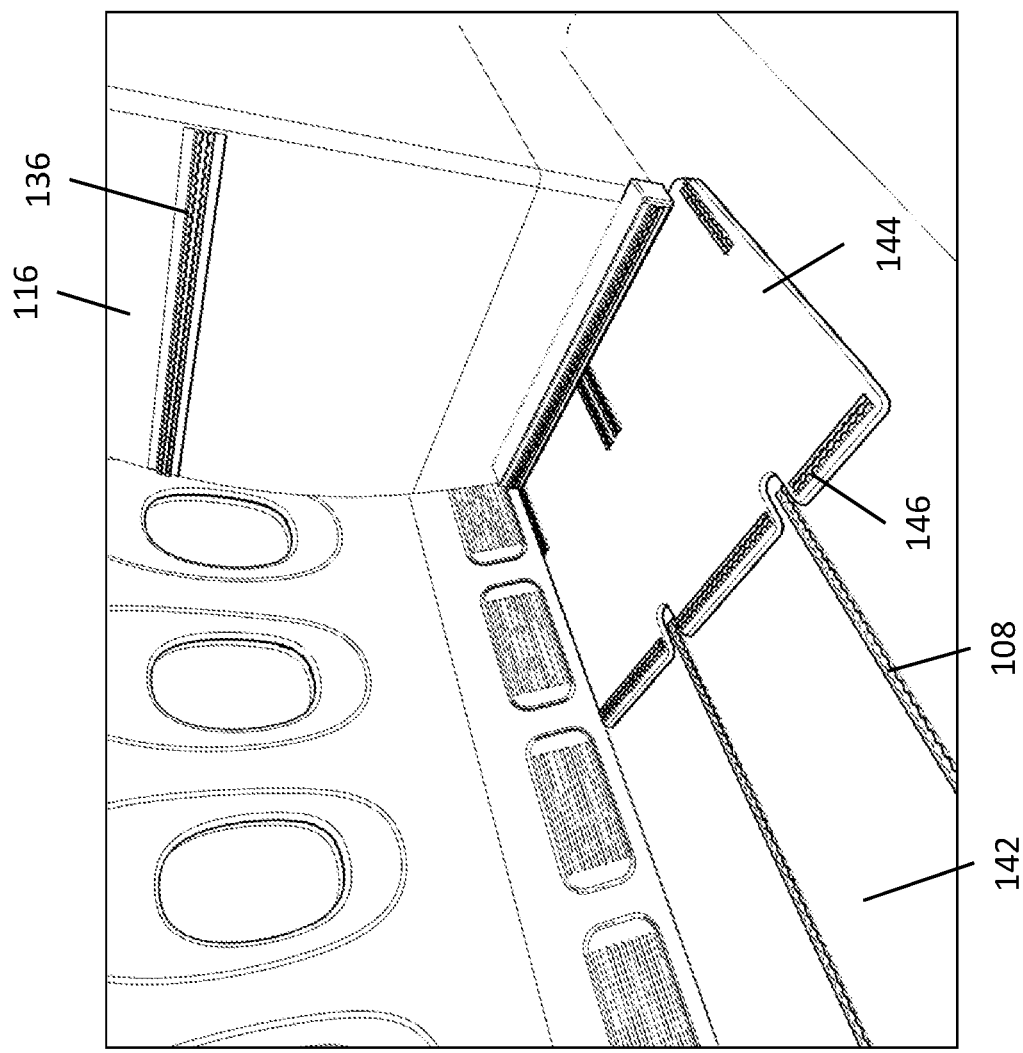
FIG. 9 is a perspective view of an aircraft interior configuration showing a bulkhead having seat tracks, a floor pallet having seat tracks, and conventional floor seat tracks.

FIG. 9 depicts an exemplary structural floor pallet 144 configuration and the dispositions of the various seat tracks of the floor pallet 144, the floor 142, and the bulkhead 116. The number and locations of the seat tracks of the floor pallet and the bulkhead can be customized to accommodate different attendant seat constructions and envisioned to be secured in the securement space.

FIG. 10 depicts an aircraft interior configuration in which the flexible use space is configured to provide passenger seating at the inboard attendant seat position 130 and pet carrier securement space at one or more of the middle and outboard attendant seat positions 134, 132. The pet carrier 164 may be secured in place using at least one restraint assembly 156. As shown, the pet carrier 164 is secured in place using two separate restraint assemblies 156 installed crisscrossing over the top of the pet carrier, with each restraint assembly secured to separate spaced-apart seat tracks 146 of the floor pallet 144. This restraint assembly configuration can be used to secure an item in place on the floor pallet 144.

FIG. 11 depicts an aircraft interior configuration in which the flexible use space is configured to provide passenger seating at the inboard attendant seat position 130, and large object (e.g., musical instrument) securement space at one or more of the middle and outboard attendant seat positions 134, 132. The large object 166 may be secured in place using at least one restraint assembly 156 secured to a seat track 146 of the floor pallet 144 and an upper seat track 136 of the rear bulkhead 116. The various seat tracks of the floor pallet 144 and bulkhead 116 and dispositions thereof can be used to secure any item in place within the securement space, for example, against the fuselage, against the stowed attendant seats, on the floor pallet, etc.

Figure 12:
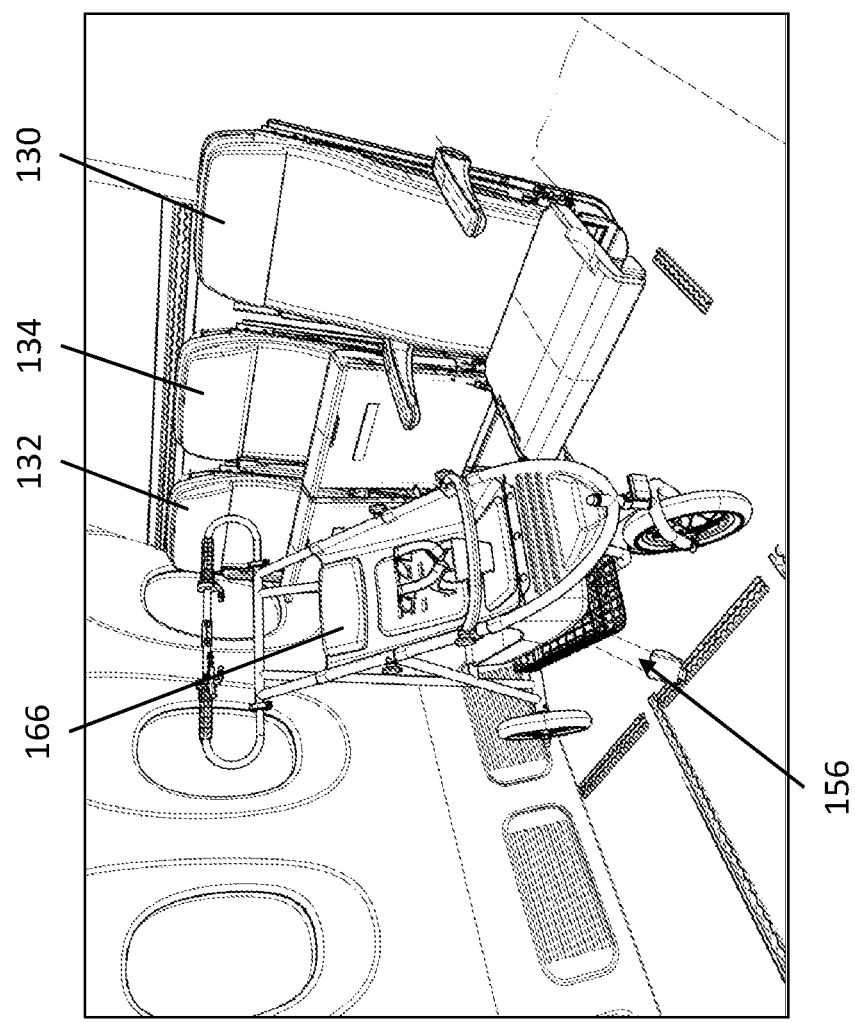
FIG. 12 is a perspective view of flexible use space shown configured for passenger seating and stroller securement.

FIG. 12 depicts an aircraft interior configuration in which the flexible use space is configured to provide passenger seating at the inboard attendant seat position 130, and stroller 166 securement space at the middle and outboard attendant seat positions 134, 132. The stroller 166 may be secured in place using at least one restraint assembly 156 secured to the seat tracks 146 of the floor pallet 144.

Exemplary restraint assemblies 156 may include adjustable-length straps. Alternatively, the lap belts of the attendant seats can be configured to function as securement straps. For example, the lap belt ends may include detachable anchor points such that the ends can detach from their respective anchor points when functioning as a lap belt, and secure to one of the seat tracks of the floor pallet and the bulkhead to function as a restraint assembly. For example, the lap belt ends may anchor to the lower bulkhead seat track when the lap belt is used as a lap belt and may anchor to the same or other seat tracks when the lap belt is used as a securement strap. The lap belts may have an adjustable length and lap belt extensions may be used when securing a large object. Oversized items and items requiring a large distance between attachment points may require dedicated straps having a long length. The number of restraint assemblies, type of restraint assemblies, and attachment locations may depend on the item to be secured.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An interior configuration for an aircraft, comprising:
an aisle extending along a longitudinal axis of the aircraft;
a flexible use space disposed laterally adjacent the aisle;
a bulkhead disposed at one end of the flexible use space;
an upper seat track and a lower seat track affixed to the bulkhead, the upper seat track and the lower seat track positioned in spaced apart relation;
attendant seats disposed in the flexible use space affixed to the bulkhead, each of the attendant seats including a frame, a backrest coupled to the frame, and a flip-up seat bottom pivotally attached to the frame, wherein the upper seat track is positioned above the backrests of the attendant seats;
a floor pallet disposed in the flexible use space comprising at least one seat track; and
at least one restraint assembly for securing an item in place on the floor pallet, the at least one restraint assembly having a first end attachable to the at least one seat track of the floor pallet and a second end attachable to at least one of the upper and lower seat tracks affixed to the bulkhead;
wherein the flexible use space is reconfigurable between a first configuration in which the attendant seats are used as passenger seats, and a second configuration in which at least one seat bottom is flipped up to provide securement space to receive and secure an item in place on the floor pallet.

2. The interior configuration of claim 1, wherein the attendant seats comprise an inboard attendant seat disposed adjacent the aisle, an outboard attendant seat disposed adjacent a fuselage of the aircraft, and a middle attendant seat disposed between the inboard and outboard attendant seats, and wherein in the second configuration the seat bottom of the outboard attendant seat is flipped down for use as a seat and the seat bottom of each of the middle and inboard attendant seats is flipped up to provide securement space in the flexible use space to receive and secure in place a wheelchair on the floor pallet using the at least one restraint assembly.

3. The interior configuration of claim 1, wherein the bulkhead is a rear bulkhead disposed perpendicular to the longitudinal axis of the aircraft, the attendant seats are disposed forward facing, and passenger seats adjacent the flexible use space are disposed forward facing.

4. The interior configuration of claim 1, wherein the attendant seats are free of attachment to the floor pallet.

5. The interior configuration of claim 1, wherein the floor pallet comprises at least one seat track disposed perpendicular to the longitudinal axis of the aircraft and at least one seat track disposed parallel to the longitudinal axis of the aircraft.

6. The interior configuration of claim 1, wherein the floor pallet is affixed to a floor of the aircraft and comprises at least one recess disposed along an edge thereof positioned in surrounding relation to a leg of a passenger seat disposed adjacent the flexible use space.

7. The interior configuration of claim 1, wherein the at least one restraint assembly is an attendant seat lap belt comprising detachable anchor points at opposing ends of an adjustable length strap.

8. The interior configuration of claim 1, further comprising passenger seats disposed forward of the flexible use space.

* * * * *